US012789856B2

(12) United States Patent
Kang et al.

(10) Patent No.: US 12,789,856 B2
(45) Date of Patent: Nov. 10, 2026

(54) APPARATUS AND METHOD FOR VEHICLE CONTROL ASSOCIATED WITH STOPPING POINT BASED ON DETECTED POTENTIAL PASSENGER

(71) Applicants: Hyundai Motor Company, Seoul (KR); Kia Corporation, Seoul (KR)

(72) Inventors: Yimju Kang, Seoul (KR); Hoon Lee, Gunpo-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 411 days.

(21) Appl. No.: 18/228,854

(22) Filed: Aug. 1, 2023

(65) Prior Publication Data

US 2024/0199081 A1 Jun. 20, 2024

(30) Foreign Application Priority Data

Dec. 16, 2022 (KR) ........................ 10-2022-0177524

(51) Int. Cl.

| | |
|---|---|
| ***G01C 22/00*** | (2006.01) |
| ***B60W 30/14*** | (2006.01) |
| ***B60W 30/18*** | (2012.01) |
| ***B60W 60/00*** | (2020.01) |

(52) U.S. Cl.

CPC .... *B60W 60/00253* (2020.02); *B60W 30/143* (2013.01); *B60W 30/181* (2013.01); *B60W 2510/00* (2013.01); *B60W 2554/4044* (2020.02)

(58) Field of Classification Search

CPC ......... B60W 60/00253; B60W 30/143; B60W 30/181; B60W 2554/4044; B60W 2510/00

See application file for complete search history.

(56) References Cited

U.S. PATENT DOCUMENTS

| | | | | |
|---|---|---|---|---|
| 11,332,159 | B2 | 5/2022 | Kim et al. | |
| 2021/0331702 | A1 | 10/2021 | Kim et al. | |
| 2022/0073099 | A1 * | 3/2022 | Park | B60W 60/0013 |
| 2022/0101633 | A1 * | 3/2022 | Nishiyama | G06T 7/20 |
| 2022/0111871 | A1 * | 4/2022 | Schmitt | B60Q 1/507 |
| 2024/0278807 | A1 * | 8/2024 | Setoguchi | G06Q 10/02 |

FOREIGN PATENT DOCUMENTS

| | | | |
|---|---|---|---|
| KR | 101246370 | B1 | 4/2013 |
| KR | 101947278 | B1 | 5/2019 |
| KR | 10-2020-0112630 | A | 10/2020 |
| KR | 102200808 | B1 | 1/2021 |
| KR | 10-2022-0033077 | A | 3/2022 |

* cited by examiner

*Primary Examiner* — Adam M Alharbi
(74) *Attorney, Agent, or Firm* — Banner & Witcoff, Ltd.

(57) ABSTRACT

Provided are an apparatus and a method for controlling an autonomous vehicle. The apparatus for controlling the autonomous vehicle includes a sensor that acquires sensed data on a vehicle surrounding, a driving device that drives the vehicle, and a processor that detects a passenger based on the sensed data, determines a stop point for stopping the vehicle in a stop zone, determines a decelerating section till a specific distance from the stop point, and controls the driving device so that a speed of the vehicle at an end point of decelerating section is lower than a speed of the vehicle at the starting point of the decelerating section.

20 Claims, 15 Drawing Sheets

APPARATUS AND METHOD FOR VEHICLE CONTROL ASSOCIATED WITH STOPPING POINT BASED ON DETECTED POTENTIAL PASSENGER

CROSS-REFERENCE TO RELATED APPLICATION

This application claims the benefit of priority to Korean Patent Application No. 10-2022-0177524, filed in the Korean Intellectual Property Office on Dec. 16, 2022, the entire contents of which are incorporated herein by reference.

TECHNICAL FIELD

The present disclosure relates to an apparatus and a method for controlling a vehicle, and more particularly, relates to a technology allowing a passenger to get on an autonomous vehicle or allowing the autonomous vehicle to stop.

BACKGROUND

As expectations for driving convenience and safety increase, the use of an advanced driver assistance system (ADAS) of a vehicle is increasing.

To improve driver convenience, various researches for autonomous vehicles have been conducted. The autonomous vehicle has been developed such that levels of the autonomous vehicle are classified depending on the degree of driver intervention. Technology for an autonomous vehicle has been gradually developed to attain a level of an unmanned driving without any intervention of a driver.

If an autonomous driving scheme not requiring a driver is applied to a vehicle, such as a bus, in which passengers are not specified, the autonomous vehicle may need to stop at all stations while considering passengers not specified. Accordingly, even when any passenger does not get on or get off, the autonomous vehicle unnecessarily stops at a station. Accordingly, a vehicle operating service may be degraded.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure is to provide an apparatus and a method for controlling an autonomous vehicle, capable of reducing and/or preventing an autonomous driving bus from unnecessarily stopping at a station.

An efficient stop technology allowing a passenger to get on or get off to perform a shuttle service using an autonomous vehicle without the intervention of the driver may be provided.

An aspect of the present disclosure is to provide an apparatus and a method for controlling an autonomous vehicle, capable of easily stopping for an unexpected passenger even after passing through a stop point.

An aspect of the present disclosure is to provide an apparatus and a method for controlling an autonomous vehicle, capable of preventing a passenger from feeling uncomfortable while the autonomous vehicle is stopping.

The technical problems to be solved by the present disclosure are not limited to the aforementioned problems, and any other technical problems not mentioned herein will be clearly understood from the following description by those skilled in the art to which the present disclosure pertains.

An apparatus may comprise: at least one sensor configured to acquire sensed data associated with at least one object in proximity to a vehicle; a driving device configured to drive the vehicle; and at least one processor configured to: detect, based on the sensed data, a potential passenger; determine, based on a detection of the potential passenger, a stop point for stopping the vehicle in a stop zone; determine a decelerating section associated with the stop point; and control the driving device to control a speed of the vehicle at an end point of the decelerating section to be lower than a speed of the vehicle at a starting point of the decelerating section.

The at least one processor may be configured to: determine, as the potential passenger, an object corresponding to a person present within a first reference radius from the stop point.

The at least one processor may be configured to: determine, as the potential passenger, an object approaching the vehicle or moving to the stop point, within a second reference radius from the stop point, wherein the second reference radius is greater than the first reference radius.

The at least one processor may be configured to: determine the stop point by searching for position coordinates matched with the stop point within a specific distance from the vehicle.

The at least one processor may be configured to: detect, based on the sensed data, a surrounding object in a region associated with the position coordinates; and determine the stop point while excluding a region in which the surrounding object is detected.

The at least one processor may be configured to: after the vehicle passes the stop point, control the driving device to maintain a first speed, of the vehicle, for a specific period within the stop zone.

The at least one processor may be configured to: control, based on the potential passenger being not detected, the driving device to drive the vehicle at a first speed at a time point at which the decelerating section ends.

The at least one processor may be configured to: determine a second stop point after passing the stop point; and perform accelerating or decelerating before reaching the second stop point.

The at least one processor may be configured to: control, based on a second stop point being not determined, the driving device to accelerate the vehicle so that the vehicle moves out of the stop zone.

The at least one processor may be configured to: based on a jerk, an acceleration, and a target stop distance of the vehicle, determine a first speed and whether to accelerate or decelerate the vehicle.

A method may comprise: detecting, by an apparatus, a potential passenger; determining, by the apparatus and based on a detection of the potential passenger, a stop point for stopping a vehicle in a stop zone; determining, by the apparatus, a decelerating section associated with the stop point; and controlling, by the apparatus, a speed of the vehicle at an end point of the decelerating section to be lower than a speed of the vehicle at a starting point of the decelerating section.

The detecting of the potential passenger may comprise: determining whether an object is present within a first reference radius from the stop point.

The detecting of the potential passenger may comprise: determining whether the object approaches the vehicle or moves to the stop point, within a second reference radius from the stop point, wherein the second reference radius is greater than the first reference radius.

The determining of the stop point may comprise: searching for position coordinates matched with the stop point within a specific distance from the vehicle.

The determining of the stop point may comprise: acquiring, by a sensor, sensed data associated with at least one object in proximity to a vehicle; detecting, based on the sensed data, a surrounding object in a region associated with the position coordinates; and determining the stop point while excluding a region in which the surrounding object is detected.

The controlling of the speed of the vehicle may comprise: after the vehicle passes the stop point, maintaining a first speed, of the vehicle, for a specific period within the stop zone.

The controlling of the speed of the vehicle may comprise: controlling, based on the potential passenger being not detected, the speed of the vehicle to be decelerated to the first speed in the decelerating section.

The controlling of the speed of the vehicle may comprise: determining a second stop point after passing the stop point; and performing accelerating or decelerating before reaching the second stop point.

The controlling of the speed of the vehicle may comprise: controlling, based on a second stop point being not determined, a driving device to accelerate the vehicle so that the vehicle moves out of the stop zone The controlling of the speed of the vehicle may comprise: determining the first speed and whether to accelerate or decelerate the vehicle.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
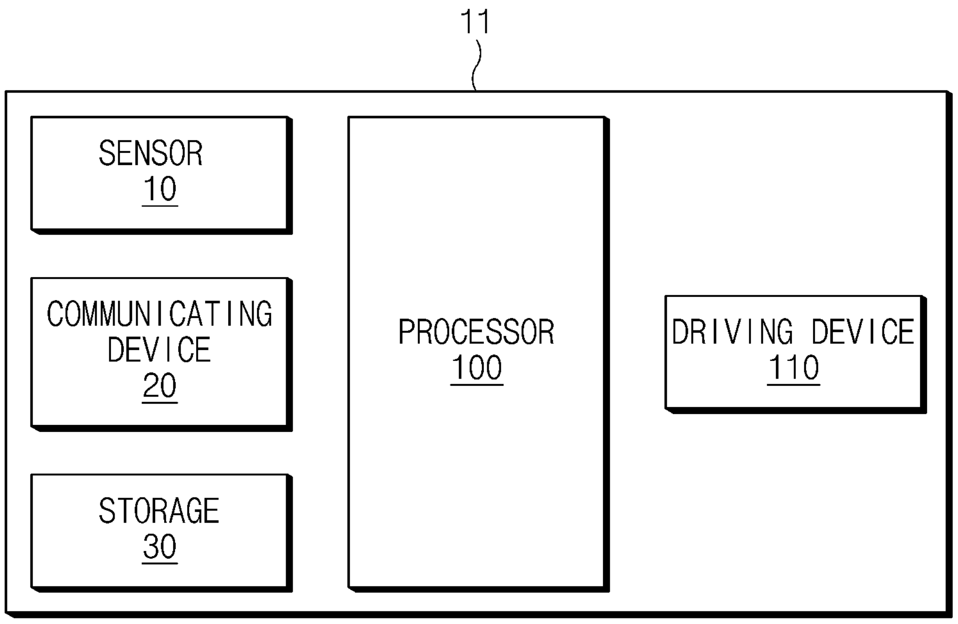
FIG. 1 is a view illustrating an apparatus for controlling an autonomous vehicle.

Hereinafter, various examples of the present disclosure will be described in detail with reference to the accompanying drawings. In adding the reference numerals to the components of each drawing, it should be noted that the identical or equivalent component is designated by the identical numeral even when they are displayed on other drawings. Further, in describing the present disclosure, a detailed description of well-known features and/or functions may be omitted in order not to unnecessarily obscure the gist of the present disclosure.

In addition, in the following description of components according to an embodiment of the present disclosure, the terms 'first', 'second', 'A', 'B', '(a)', and ' (b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, examples of the present disclosure will be described in detail with reference to FIGS. 1 to 14.

FIG. 1 is a view illustrating an apparatus for controlling an autonomous vehicle.

Referring to FIG. 1, an apparatus 11 (e.g., an apparatus for controlling an autonomous vehicle) may include a sensor 10, a communication device 20, a storage 30, a processor 100, and a driving device 110. The apparatus 11 may be implemented inside a vehicle. The apparatus 11 may be formed integrally with internal control units of the vehicle or may be implemented separately from the internal control units of the vehicle to be connected with the internal control units of the vehicle through a separate connector.

The sensor 10 may acquire sensing data on the surrounding of the vehicle, and may provide, to the processor 100, the acquired sensing data.

The sensor 10 may include at least one of Radio Detecting and Ranging (RADAR), Light Detection and Ranging (LiDAR), a camera, an ultra-sonic sensor, and/or an infrared sensor.

The RADAR may include a transmit module or a receive module for an electromagnetic wave. The RADAR may be implemented in a pulse Radar scheme and/or continuous wave radar scheme according to the principle of propagating a radio wave. The RADAR may be implemented in a frequency modulated continuous wave (FWCW) scheme or a frequency shift keying (FSK) scheme in the continuous wave radar scheme, depending on a signal waveform.

The RADAR may sense an object based on a Time of Flight scheme, and/or a phase-shift scheme through a radio wave, and may detect the position of the sensed object, the distance from the sensed object, and the relative velocity.

The LiDAR may include a transmit module or a receive module for an electromagnetic wave. The LiDAR may be implemented in a TOF scheme or phase-shift scheme.

The LiDAR may be exposed to the outside of the vehicle to sense an object positioned at a front portion, a rear portion, and/or a side portion of the vehicle.

The camera may be positioned at an appropriate outer portion of the vehicle to acquire an external image of the vehicle. For example, the camera may be positioned at the front potion, the rear portion, a right side mirror, and/or a left side mirror of the vehicle. The camera may include a mono-camera, a stereo-camera, an around view monitoring (AVM) camera, and/or a 360-degree camera.

The camera may be placed to be adjacent to a front wind shield interior the vehicle and/or in the vicinity of a front bumper or a radiator, to acquire the image of the front portion of the vehicle.

The camera may be placed in an interior, which may be adjacent to at least one of side windows, of the vehicle, to obtain an image of the side portion of the vehicle. The camera may be placed in the vicinity of a fender and/or a door.

The ultrasonic sensor may include an ultrasonic transmit module and/or an ultrasonic receive module. The ultrasonic sensor may sense an object based on an ultrasonic wave and sense a position of the sensed object, a distance from the sensed object, and a relative velocity. The ultrasonic sensor may be positioned at an appropriate outer portion of the vehicle to sense an object positioned at the front portion, the rear portion, and/or the side portion of the vehicle.

The infrared sensor may include an infrared transmit module and/or an infrared receive module. The infrared sensor may sense an object based on an infrared beam and sense a position of the sensed object, a distance from the sensed object, and a relative velocity. The infrared sensor may be placed at the outer portion of the vehicle to sense an object positioned at a front portion, a rear portion, and/or a side portion of the vehicle.

The communication device 20 may communicate with a user terminal, another vehicle, and/or an external server.

The communication device 20 may perform short range communication, receive a GPS signal, V2X communication, transmit/receive a broadcast, and/or perform intelligent transport system (ITS) communication.

The communication device 20 may support short-range communication through at least one of Bluetooth™, Radio Frequency Identification (RFID), Infrared Data Association (IrDA), Ultra Wideband (UWB), ZigBee, Near Field Communication (NFC), wireless-fidelity (Wi-Fi), Wi-Fi Direct, or Wireless Universal Serial Bus (USB).

The communication device 20 may include a global positioning system (GPS) module and/or a differential global positioning system (DGPS) module to acquire position information.

The communication device 20 may include a module to support wireless communication between a vehicle and a server (vehicle to infra; V2I), between the vehicle and another vehicle (vehicle to vehicle; V2V), and/or between the vehicle and a pedestrian (vehicle to pedestrian; V2P). The V2X communication module may include a radio frequency (RF) circuit allowing the implementation of a V2I protocol, a V2V protocol, and/or a V2P protocol.

The communication device 20 may transmit/or receive a wireless signal together with at least one of a base station, an external terminal, or a center, for example, over a mobile communication network constructed depending on a technology standard for mobile communication or a communication scheme. For example, the communication device 20 may perform communication, based on global system for mobile communication (GSM), code division multi access (CDMA), code division multi-access 2000 (CDMA2000), enhanced voice-data optimized or enhanced voice-data only (EV-DO), wideband CDMA (WCDMA), high velocity downlink packet access (HSDPA), high velocity uplink packet access (HSUPA), long term evolution (LTE), long term evolution-advanced (LTE-A), or the like. The wireless signal may include various forms of data according to transmission/reception of a voice call signal, a video call signal or a text/multimedia message.

The storage 30 may store sensing data acquired by the sensor 10, and may store position information and/or driving information of preceding vehicles, which may be provided via the communication device 20. The storage 30 may include an artificial intelligence (AI) module for AI learning for the processor 100.

The storage 30 may be provided inside the processor 100 and may be a separate memory. The storage 30 may include at least one of (or one or more combinations of) a non-volatile memory, such as a hard disk driver, a flash memory, an electrically erasable programmable read-only memory (EEPROM), a static RAM (SRAM), a ferro-electric RAM (FRAM), or a phase-change RAM (PRAM), a magnetic RAM (MRAM), and/or a volatile memory, such as a dynamic random access memory (DRAM), a synchronous dynamic random access memory (SDRAM), or a double data rage-SDRAM (DDR-SDRAM).

The processor 100 may detect a passenger based on sensed data.

The processor 100 may determine whether to stop the vehicle, based on a detected passenger. The processor 100 may determine whether to stop the vehicle, in response to a get-on request or a get-down request from an external terminal via the communication device 20.

The processor 100 may determine a stop point for stopping the vehicle inside a stop zone for determining the vehicle to be stopped (e.g., when determining the vehicle to be stopped).

The processor 100 may identify the stop point within a specific distance from the vehicle, to determine the stop point. For example, the processor 100 may search for a position coordinate corresponding to a guide plate for informing a station, and/or a guide plate for informing a station number.

The processor 100 may determine the movement of preceding vehicles based on the sensed data, and may determine whether the preceding vehicles are stopped. For example, the processor 100 may stop the vehicle at a rear portion of the preceding vehicles (e.g., when the preceding vehicles are first stopped). The processor 100 may receive driving information of the preceding vehicles from the communication device 20, to determine whether the preceding vehicles are stopped.

The processor 100 may determine a decelerating section till a specific distance from a stop point (e.g., after determining the stop point). The processor 100 may control the driving device 110, such that a driving velocity at a time point at which the decelerating section is ended is lower than a driving velocity at a time point at which the decelerating section is started. Accordingly, the driving velocity may be temporarily maintained or accelerated in the decelerating section.

The processor 100 may perform the AI learning to detect a passenger based on the sensed data. To this end, the processor 100 may use an AI processor stored in the storage 30. The AI processor may train a neural network using a program which is previously stored. The neural network to recognize an object may be designed such that a brain structure of a human being is simulated in a computer, and may include a plurality of nodes (e.g., simulating a neuron of the neural network of the human being and having weights). The plurality of network nodes may transmit or receive data based on a connection relation to simulate a synaptic activity of a neuron, which allows the neuron to transmit or receive a signal through a synapse. The neural network may include a deep learning model developed from the neural network model. The plurality of network nodes in the deep learning model may be positioned in mutually different layers to transmit and/or receive data based on the convolution connection relation. For example, the neural network model may include various deep learning schemes, such as deep neural networks (DNN), convolutional deep neural networks (CNN), recurrent Boltzmann machine (RNN), restricted Boltzmann machine (RBM), deep belief networks (DBN), or a deep Q-network.

The driving device 110 may drive the vehicle under the control of the processor 100. The driving device 110 may include a steering device, an acceleration device, and/or a brake device.

Figure 2:
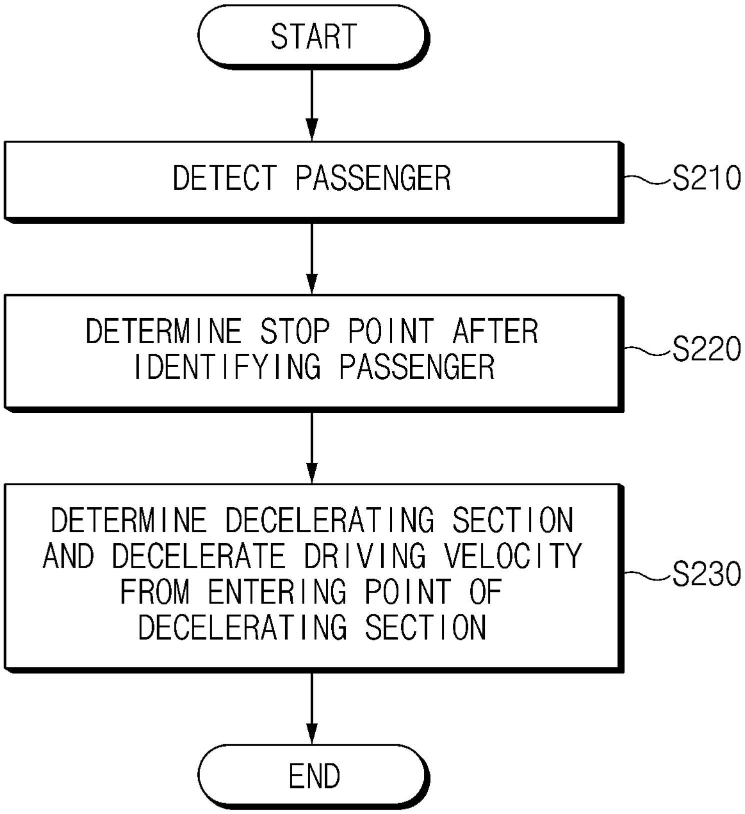
FIG. 2 is a flowchart illustrating a method for controlling an autonomous vehicle.
Figure 3:
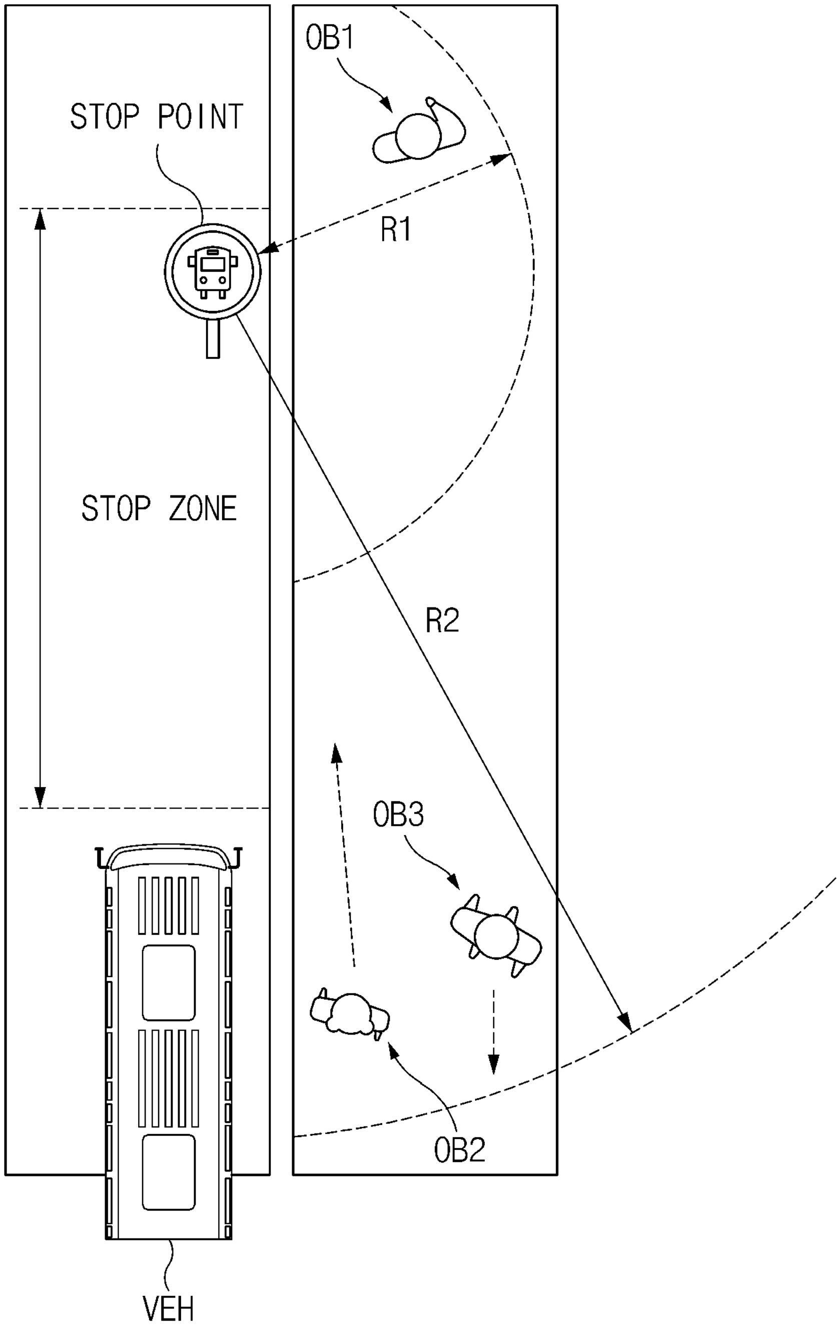
FIG. 3 is a view illustrating a passenger detected in the method for controlling the autonomous vehicle.
Figure 4A:
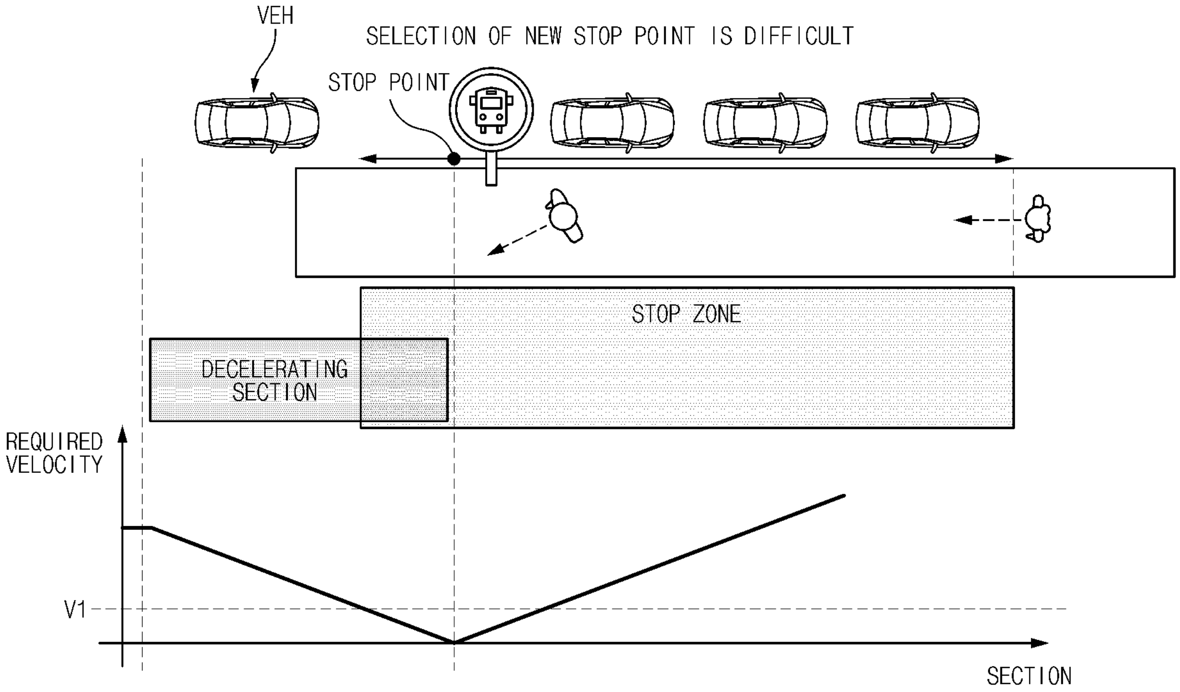
FIG. 4A and FIG. 4B illustrate that a vehicle passes through a stop zone.
Figure 4B:
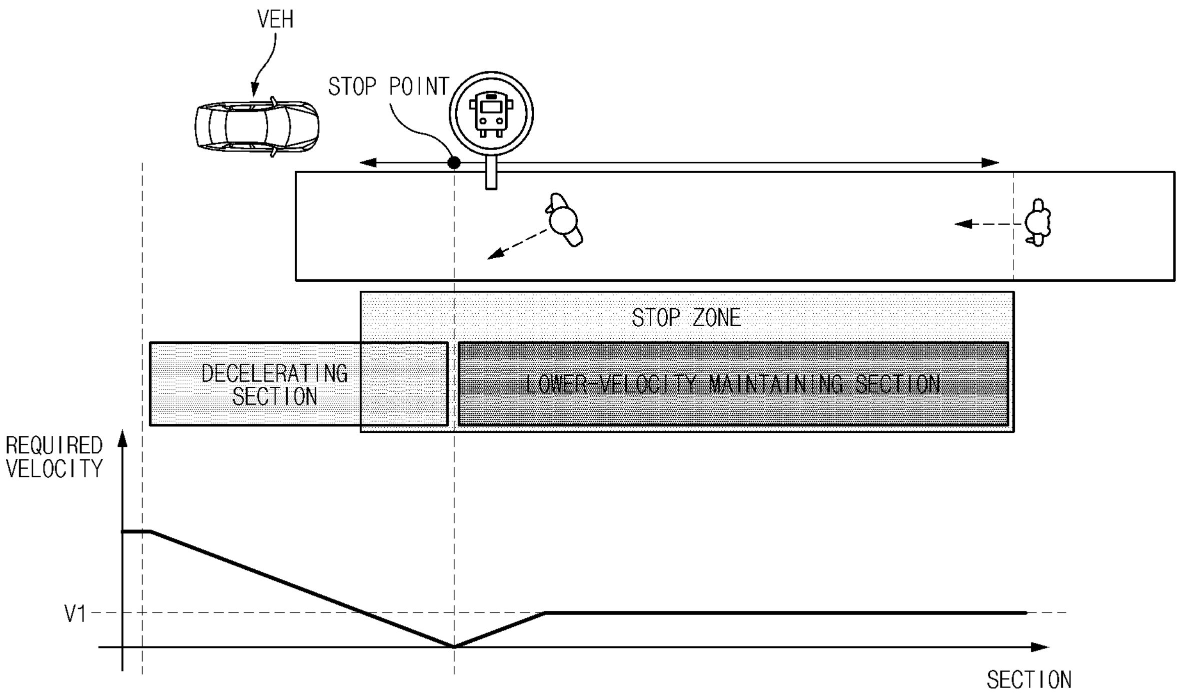

FIG. 2 is a flowchart illustrating a method for controlling an autonomous vehicle. FIG. 3 is a view illustrating a passenger detected in the method for controlling the autonomous vehicle. FIGS. 4A and 4B are views illustrating a manner for controlling a driving vehicle of the autonomous vehicle. FIGS. 4A and 4B illustrate a vehicle velocity controlled, based on the method for controlling the autonomous vehicle illustrated in FIG. 2.

Hereinafter, the method for controlling the autonomous vehicle will be described with reference to FIGS. 2 to 4. The procedure illustrated in FIG. 2 will be described below based on the features performed by the processor 100 of FIG. 1, but aspects of the present disclosure are not limited thereto.

In S210, the processor 100 may detect a potential passenger (hereinafter referred to as a "passenger") in the stop zone. The procedure of detecting the passenger may be a procedure of determining a passenger who wants to get on the autonomous vehicle FIG. 3 is a view illustrating a passenger detected.

Referring to FIG. 3, the processor 100 may acquire sensing data for detecting the surrounding object (s) of the vehicle, through the sensor 10, such that the passenger is detected.

The processor 100 may detect an object corresponding to a human based on the sensing data. For example, the processor 100 may detect a first object OB1 to a third object OB3 as illustrated in FIG. 3.

The processor 100 may calculate the distance between the object and the stop point.

The processor 100 may determine a passenger based on the distance between the object and the stop point.

The processor 100 may determine, as the passenger, an object within a first reference radius R1 from the stop point. For example, if the distance between the stop point and the first object OB1 is shorter than the first reference radius R1, the processor 100 may determine, as the passenger, the first object OB1.

The processor 100 may determine, as the passenger, an object OB2, which approaches the stop point, of objects within a second reference radius R2 from the stop point.

The processor 100 may determine, as the passenger, an object OB2, which approaches in a forward direction of a vehicle VEH, of objects within the second reference radius R2 from the stop point.

The second reference radius R2 may be set to be greater than the first reference radius R1. The processor 100 may determine that the object (e.g., the object approaching the stop point or the vehicle VEH) has an intention to get on the vehicle VEH (e.g., an intention to board the vehicle VEH), even though the object is not close to the stop point.

The processor 100 may not determine, as the passenger, the third object OB3 farther away from the stop point or moving in a direction opposite to the forward direction of the vehicle VEH, even if the third object OB3 is within the second reference radius R2.

In S220 of FIG. 2, the processor 100 may determine the stop point in the stop zone, based on the passenger being identified.

The stop point may be determined based on information on a position at which a plate for indicating a station or a guide plate for informing a route number is provided.

Alternatively or additionally, the stop point may be determined based on whether the preceding vehicles are stopped in the stop zone. For example, the processor 100 may determine the stop point to a rear region of preceding vehicles stopped or preceding vehicles expected to be stopped, for example, if the preceding vehicles are stopped in the stop zone.

The processor 100 may utilize the sensing data acquired through the sensor 10 to determine whether the preceding vehicles are stopped. Alternatively or additionally, the processor 100 may determine whether the preceding vehicles are stopped, based on the communication together with the preceding vehicles and the external server, through the communication device 20.

In S230 of FIG. 2, the processor 100 may determine the decelerating section, and control the vehicle such that the decelerating driving is performed in the decelerating section.

The length of the decelerating section may be preset. Alternatively or additionally, the length of the decelerating section may be varied depending on the velocity of the vehicle during driving. For example, the length of the decelerating section may be set to be longer, as the velocity of the vehicle VEH is increased. A point (or an ending point) at which the decelerating section is ended may be the stop point.

After the passenger gets on the vehicle at the stop point, the processor 100 may pass through the stop zone by gradually increasing the velocity of the vehicle.

Examples of the vehicle passing through the stop zone may be classified into the cases illustrated in FIG. 4A and FIG. 4B.

FIG. 4A and FIG. 4B illustrate that the vehicle passes through the stop zone. FIG. 4A is a view illustrating that a new stop point is not able to be set in the stop zone, and FIG. 4B is a view illustrating a new stop point is able to be set in the stop zone.

Referring to FIG. 4A, the processor 100 may control the vehicle to move out of the stop zone by accelerating the velocity of the vehicle, for example, if the processor 100 determines that the setting of a new stop zone is difficult due to other vehicles (e.g., vehicles in front of the vehicle) in the stop zone.

Referring to FIG. 4B, when a new stop point is able to be set in the stop zone, after the stop point, the processor 100 may control the vehicle to maintain a first velocity V1 (e.g., speed) at a lower-velocity maintaining section while monitoring a new passenger. Since the vehicle (e.g., the vehicle VEH) drives at the first velocity V1, which is a lower velocity (e.g., 1 to 10 mile/hour, 1 to 20 mile/hour, 5 to 25 mile/hour, etc.), at the lower-velocity maintaining section (e.g., a low speed zone, such as the stop zone), even if a passenger is detected except for a passenger getting on the vehicle at the stop point, the processor 100 may stop the vehicle rapidly. Even after the vehicle passes through the stop point, the processor 100 may continuously perform a monitoring operation to detect a passenger. Accordingly, the processor 100 may detect an additional passenger, through the continuous monitoring.

Figure 5:
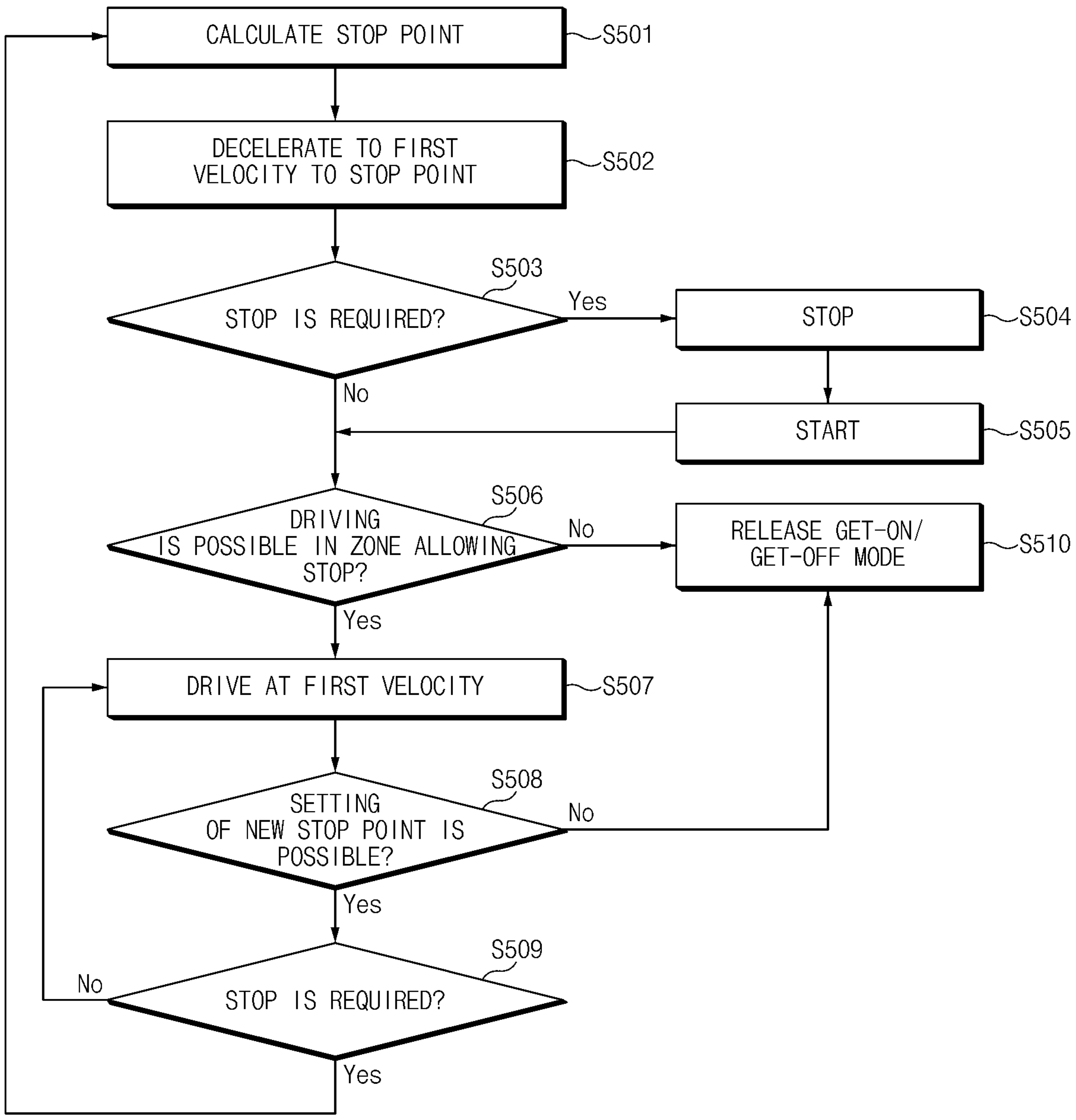
FIG. 5 is a flowchart illustrating a method for controlling an autonomous vehicle.

FIG. 5 is a flowchart illustrating a method for controlling an autonomous vehicle.

Hereinafter, the method for controlling the autonomous vehicle will be described with reference to FIG. 5.

In S510, the processor 100 may determine the stop point. For example, to determine the stop point, the processor 100 may perform step S210 and S220 illustrated in FIG. 2. The manner of determining the stop point is not limited thereto.

In S502, the processor 100 may control the velocity (e.g., speed) of the vehicle to be the first velocity V1, at the ending point of the decelerating section.

In S503, the processor 100 may determine whether the vehicle needs to be stopped.

If the vehicle needs to be stopped, the processor 100 may stop the vehicle in S504 and increase the speed of the vehicle in S505.

If the vehicle does not need to be stopped, the processor 100 may drive the vehicle while maintaining the lower velocity (e.g., 1 to 10 mile/hour, 1 to 20 mile/hour, 5 to 25 mile/hour, etc.) at the stop zone in S506 and S507. Hereinafter, the details thereof will be described with reference to FIGS. 6 and 7.

Figure 6:
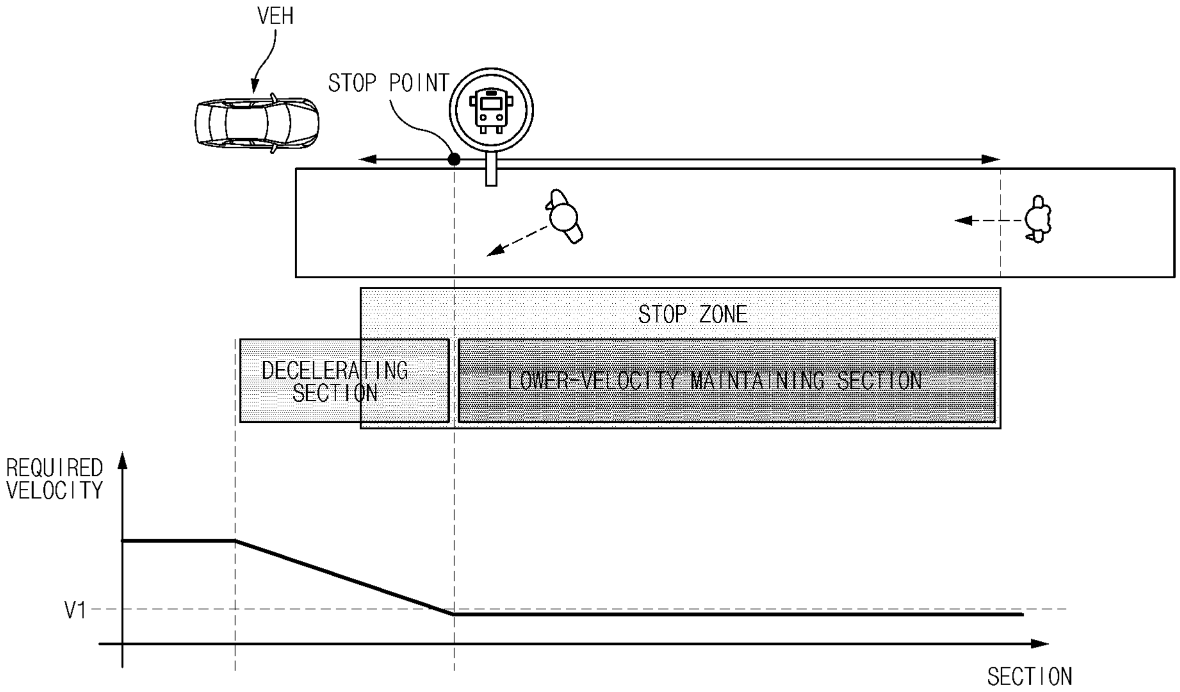
FIG. 6 is a view illustrating that a vehicle velocity is controlled in the state that a stop point is not determined.

FIG. 6 is a view illustrating that the vehicle velocity is controlled in the state that the stop point is not determined.

Referring to FIG. 6, if a potential passenger is not detected, the stop point may not be determined, and the processor 100 may decelerate the vehicle to the first velocity V1 and maintain the first velocity V1 which is a lower velocity (e.g., 1 to 10 mile/hour, 1 to 20 mile/hour, 5 to 25 mile/hour, etc.), such that the vehicle can be quickly and smoothly stopped in the stop zone.

Figure 7:
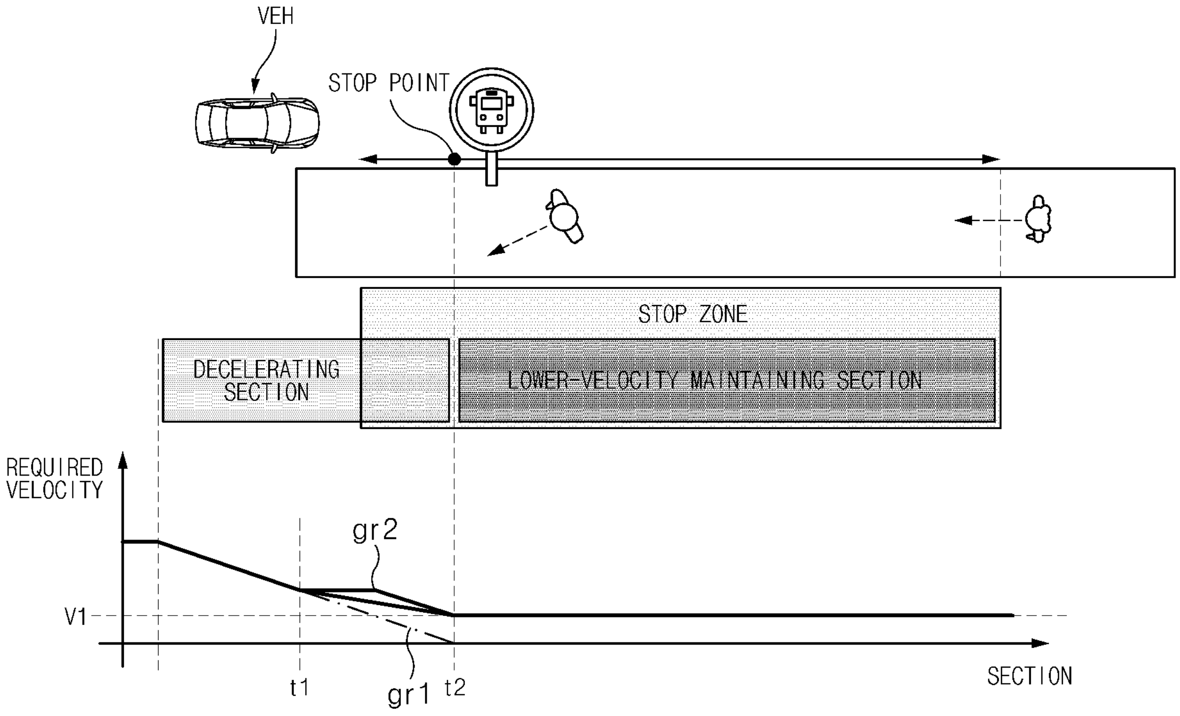
FIG. 7 is a view illustrating that a vehicle velocity is controlled after a stop point is determined.

FIG. 7 is a view illustrating that the vehicle velocity is controlled after the stop point is determined.

Referring to FIG. 7, the processor 100 may control the vehicle velocity, such that the vehicle is stopped at the stop point as illustrated in the first graph 'gr1' (e.g., when determining the stop zone by detecting the passenger). Alternatively, if the stop point is canceled at first timing 't1', the processor 100 may control the velocity of the vehicle to decelerate to the first velocity V1 during the period from the first timing t1 to the second timing t2. The first velocity V1 may be maintained during the period for maintaining the lower velocity.

In S508 and S509, the processor 100 may determine whether a new stop point is able to be set, and may proceed to S507 when it is necessary to stop the vehicle. In other words, to stop the vehicle, the processor 100 may drive the vehicle at the lower velocity of the first velocity (V1) before attempting to stop the vehicle.

If it is determined that the lower-velocity driving is difficult in a zone allowing stop in S506, the processor 100 may proceed to S510 to release the get-on/get-off mode, such that the vehicle moves out of the stop zone.

If it is determined that the setting of the new stop point is difficult in S508, the processor 100 may proceed to S510 to release a get-on/get-off mode and may control the vehicle to move out of the stop zone.

Figure 8:
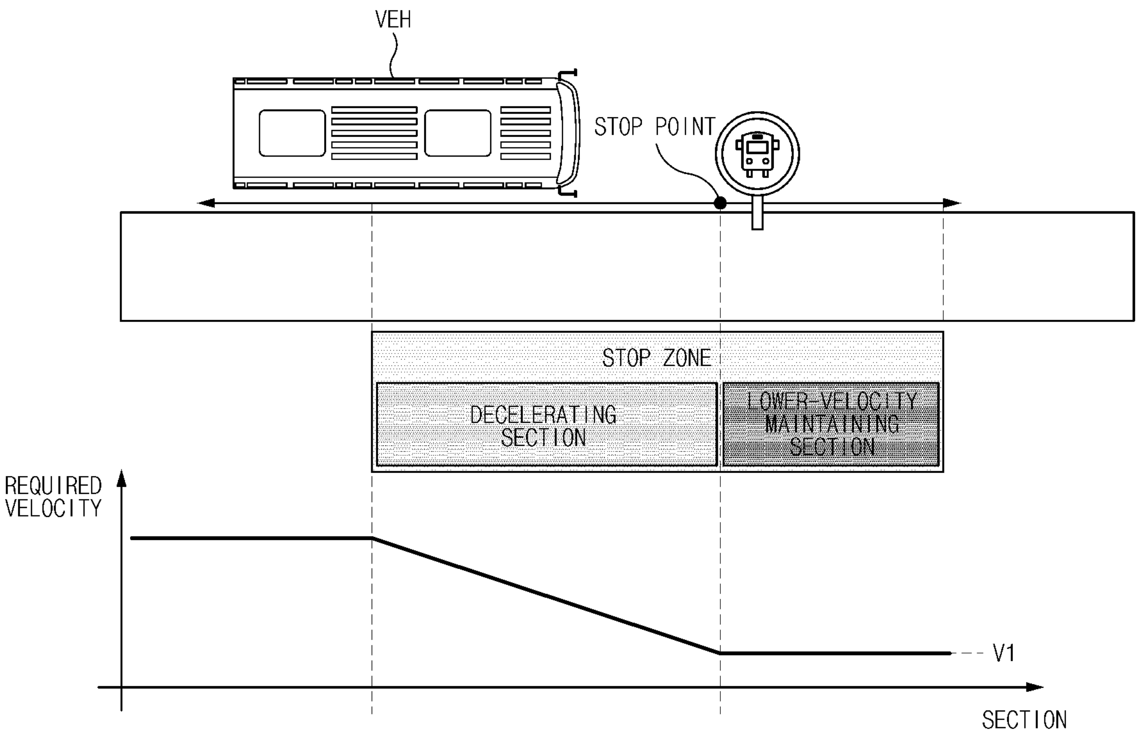
FIG. 8, FIG. 9, and FIG. 10 are views illustrating a decelerating section.
Figure 9:
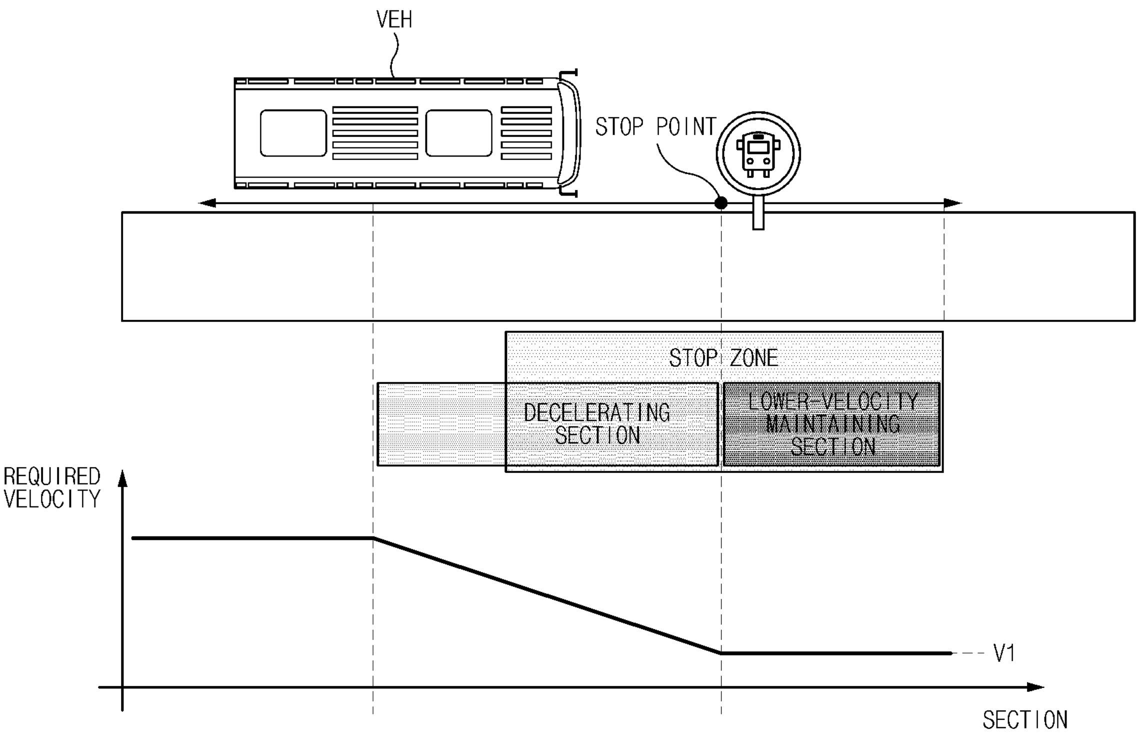
Figure 10:
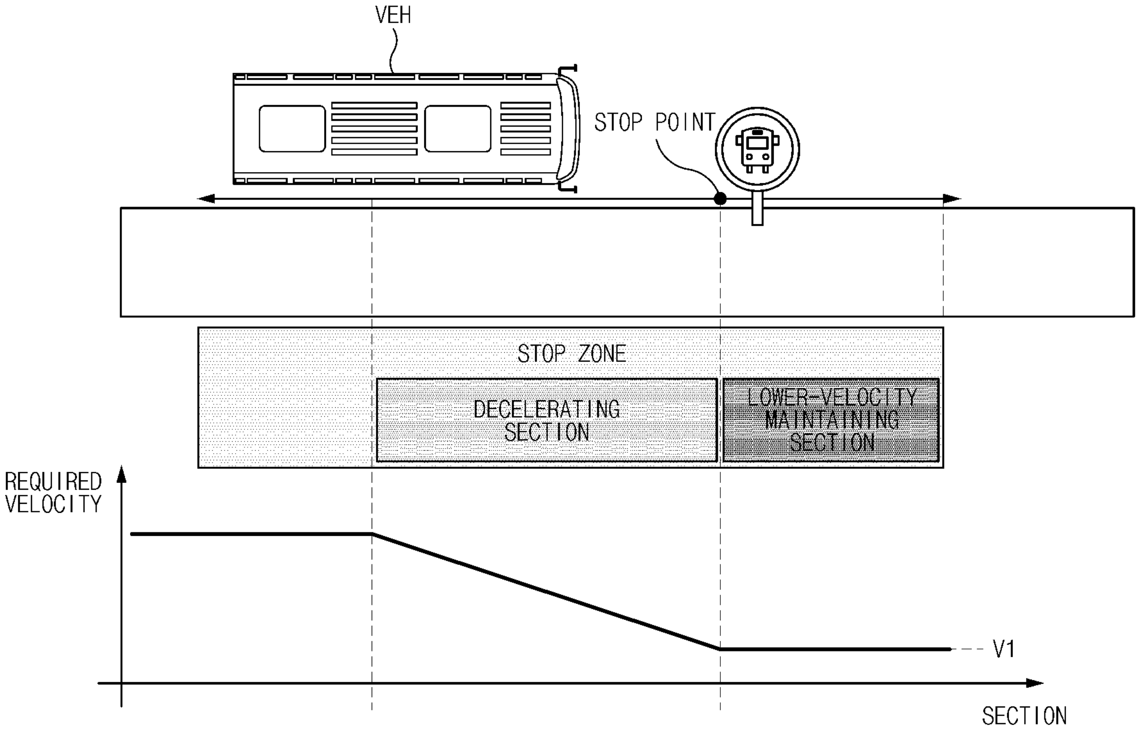

FIGS. 8 to 10 are views illustrating the decelerating section.

Referring to FIGS. 8 to 10, the length of the decelerating section may be set to one or more of various values.

Referring to FIG. 8, the starting point of the decelerating section may be matched with the entering point of the stop zone. Accordingly, the decelerating section may be included in the stop zone.

Referring to FIG. 9, the starting point of the decelerating section may be positioned before the starting point of the stop zone. FIG. 9 illustrates the stop zone having a shorter length than the length of the stop zone illustrated in FIG. 8. Accordingly, when the stop zone has the shorter length, the processor 100 may decelerate the driving velocity before the vehicle VEH arrives at the stop zone.

Referring to FIG. starting point of the decelerating section may be positioned after the starting point of the stop zone. FIG. 10 illustrates the stop zone having a longer length than the length of the stop zone illustrated in FIG. 8. Accordingly, if the stop zone has the longer length, the processor 100 may decelerate the driving velocity of the vehicle after the vehicle VEH enters into the stop zone.

Figure 11:
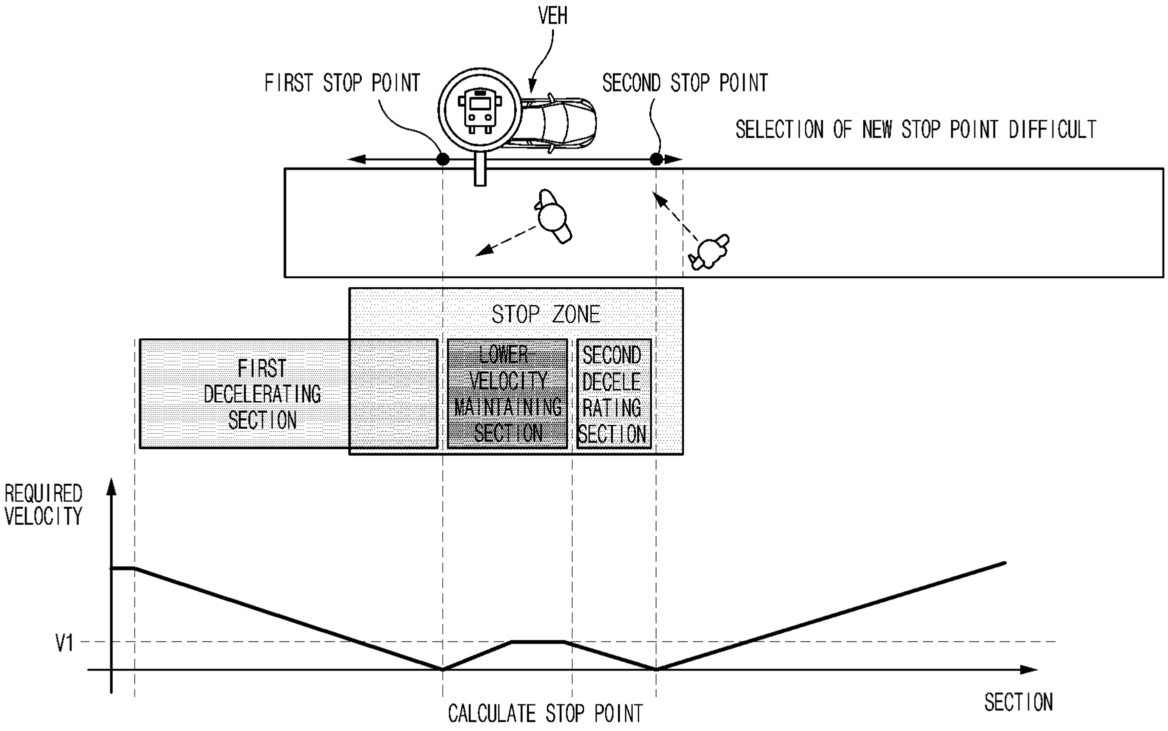
FIG. 11 and FIG. 12 are views illustrating a driving scheme after a new stop point is determined.
Figure 12:
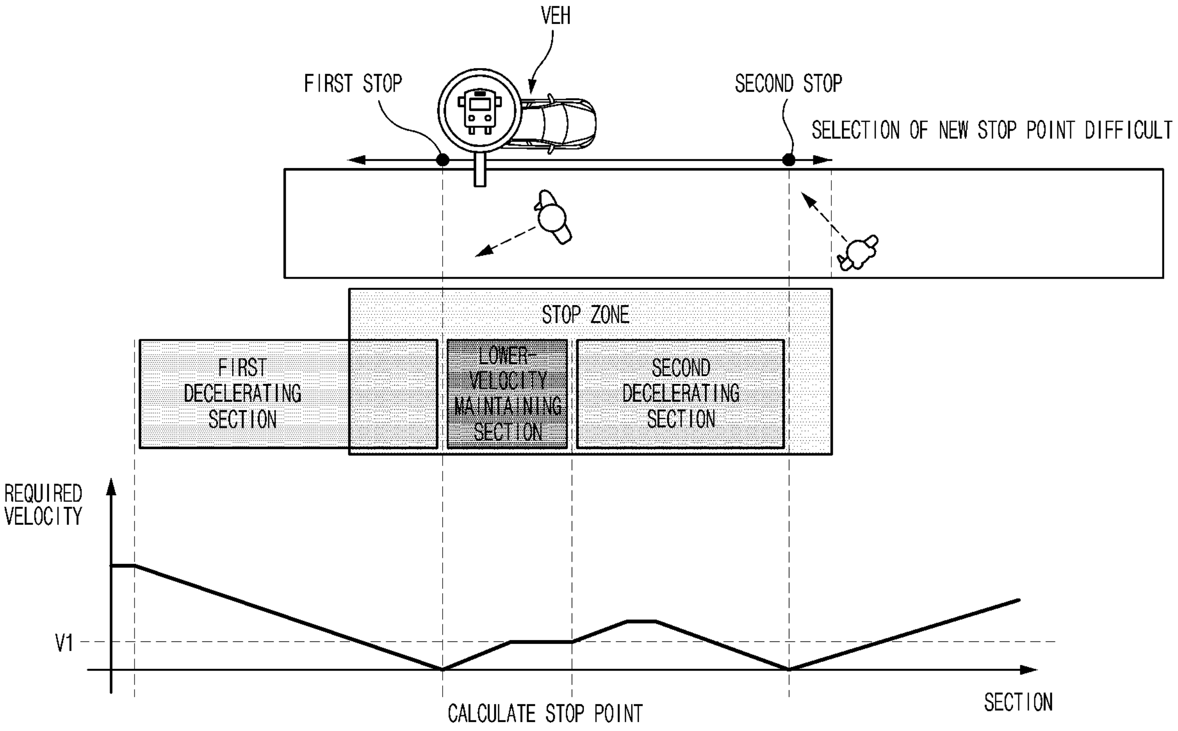

FIGS. 11 and 12 are views illustrating a driving scheme after the new stop point is determined.

Referring to FIG. 11, the processor 100 may determine a first stop point, and may control the driving velocity such that the vehicle stops at a time point at which a first decelerating section is ended.

If a section for setting the new stop point after the vehicle is stopped at the first stop point is determined, the processor 100 may drive the vehicle at the first velocity V1 after accelerating until the velocity of the vehicle reaches the first velocity V1 in the lower-velocity maintaining section of the stop zone.

If a second stop point is determined, the processor 100 may set a second decelerating section following the lower-velocity maintaining section, and may control the driving velocity in the lower-velocity maintaining section and the decelerating section, such that the vehicle is stopped in the second decelerating section.

If a section for setting the stop point is absent after the second stop point, the processor 100 may accelerate the velocity of the vehicle such that the vehicle moves out of the stop zone.

Referring to FIG. 12, the processor 100 may determine the first stop point, and may control the driving velocity such that the vehicle stops at the time point at which the first decelerating section is ended.

If a section for setting a new stop point is present after the vehicle is stopped at the first stop point, the processor 100 may drive the vehicle at the first velocity V1 after accelerating the vehicle until the vehicle speed reaches the first velocity V1 in the lower-velocity maintaining section.

The processor 100 may set the second decelerating section after the lower-velocity maintaining section, if the second stop point is determined, and may control the driving velocity of the vehicle in the lower-velocity maintaining section and the decelerating section, such that the vehicle is stopped in the second decelerating section.

If the second decelerating section has the length equal to or greater than a preset threshold or more, the processor 100 may drive the vehicle at the first velocity V1 or more in the second decelerating section to reduce the time taken to drive the second decelerating section.

For example, the autonomous control of the vehicle speed may be based on the length of the second decelerating section and the safety speed (e.g., the first speed V1) in the stop zone (e.g., at the first speed V1 at the end of the lower-velocity maintaining section). The safety speed (e.g., V1) may be maintained in one or more sections in the stop zone, and the processor 100 may maintain a deceleration level and/or a jerk level (e.g., jerk described below) to be respectively less than a deceleration threshold and/or a jerk threshold (e.g., 1 $m/s^3$), for example, to ensure a driving safety and a smooth stop of the vehicle in the stop zone).

Hereinafter, the setting of a safety velocity (e.g., the first velocity V1) in one or more sections of the stop zone will be described.

The first velocity V1 may be set to a velocity at which a sudden stop is possible within a stop distance while maintaining a deceleration level to be less than the deceleration threshold. The stop distance may be set based on a distance before the vehicle completely moves out of the stop zone after passing through the stop point. For example, the stop distance may be set to be within 2 m, 3 m, 5 m, etc.

The first vehicle V1 may be determined based on a comfort level depending on a jerk and an acceleration, to prevent passengers in the vehicle VEH from feeling uncomfortable due to a sudden deceleration that may be caused if the vehicle is suddenly stopped.

Following table 1 is a table indicating the comfort level based on the jerk.

TABLE 1

| Comfort level | Jerk ($m/s^3$) | Evaluation |
|---|---|---|
| Level 1 | <0.315 | Very Comfortable |
| Level 2 | 0.315~0.63 | Comfortable |
| Level 3 | 0.63~1.0 | Relative Comfortable |
| Level 4 | 1.0~1.6 | Uncomfortable |
| Level 5 | 1.6~2.5 | Very Uncomfortable |
| Level 6 | >2.5 | Extreme Uncomfortable |

Referring to FIG. 1, the comfort level experienced by the passengers may be increased in proportion to the jerk. It may be recognized that the passengers feel uncomfortable, as the comfort level is increased.

The comfort level may be set to be equal to or less than level 3 to prevent the user from feeling uncomfortable when the vehicle is suddenly stopped. For example, the jerk may be set to be 1.0 $m/s^3$ or less.

Following table 2 is a table indicating the comfort level based on the acceleration.

TABLE 2

| Acceleration ($m/s^2$) | Comfort Level |
|---|---|
| Acc < 0.315 | Comfortable |
| 0.315 < Acc < 0.63 | A little uncomfortable |
| 0.50 < Acc < 1.00 | Fairly uncomfortable |
| 0.80 < Acc < 1.60 | Uncomfortable |
| 1.25 < Acc < 2.50 | Very uncomfortable |
| ACC > 2.00 | Extremely uncomfortable |

Referring to Table 2, the comfort level experienced by the passengers may be increased in proportion to the acceleration Acc. It may be recognized that the passengers feel uncomfortable, as the comfort level is increased.

The acceleration may be set to be equal to or less than 1.6 $m/s^2$ to prevent the user from feeling uncomfortable when the vehicle is suddenly stopped.

The jerk may indicate the variation of the acceleration, and may be expressed as in following Equation 1.

$$j(t) = \frac{da(t)}{dt} = \frac{d^2v(t)}{dt^2} = \frac{d^3r(t)}{dt^3} \quad \text{Equation 1}$$

In Equation 1, "a" may denote an acceleration, "v" may denote a velocity, "r" may denote a position, and "t" may denote a time.

The acceleration, the velocity, and the distance may be expressed as in following Equation 2 to Equation 4.

$$a = \begin{cases} -\text{jerk} \times t, & (t \le a_{lim}) \\ -a_{lim}, & (t > a_{lim}) \end{cases} \quad \text{Equation 2}$$

$$v = \begin{cases} -\frac{1}{2}\text{jerk} \times t^2, & (t \le a_{lim}) \\ -a_{lim}(t - a_{lim}) - \frac{1}{2}a_{lim}^2 + v0, & (t > a_{lim}) \end{cases} \quad \text{Equation 3}$$

$$s = \begin{cases} -\frac{1}{6}\text{jerk} \times t^3 \times v0t, & (t \le a_{lim}) \\ -\frac{1}{2}a_{lim}t^2 - \frac{1}{2}a_{lim}^2 t + v0t - \frac{1}{6}a_{lim}^3, & (t > a_{lim}) \end{cases} \quad \text{Equation 4}$$

As described above, the stop distance (s) may be set to 2 m, the jerk may be set to 1.0 $m/s^3$, and the acceleration may be set to 1.6 $m/s^2$. If the acceleration, the jerk, and the stop distance are substituted into Equation 2 to Equation 4, the initial maximum velocity may be 5.94 km/h, and the time required for the vehicle. The initial maximum velocity may be the maximum velocity for satisfying a condition that the stop distance (s) of 2 m or less, the jerk of 1.0 $m/s^3$, and the acceleration of 1.6 $m/s^2$. Accordingly, the first velocity V1 may be set to the level of around 5.94 km/h (e.g., a range of 4 km/h to 7 km/h, etc.).

If the acceleration is determined in the section in which the vehicle is accelerated, the jerk and the comfort level may be considered. For example, as illustrated in FIG. 12, the acceleration may be set to the maximum value within a range in which passengers does not feel uncomfortable, based on the jerk and the comfort level, in the accelerating step when the vehicle enters the second acceleration section, and in the accelerating step when the second decelerating section is ended.

Figure 13:
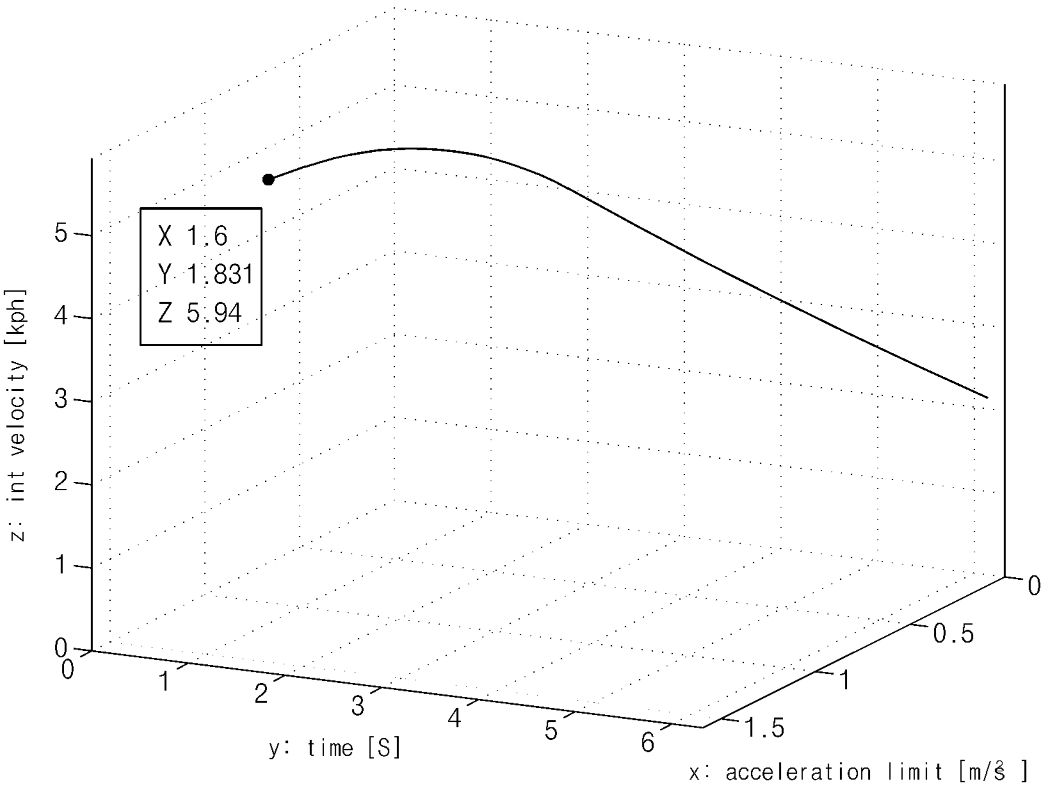
FIG. 13 is a view illustrating a simulation of the relation among an acceleration, a time for stop, and an initial velocity.

FIG. 13 is a view illustrating a simulation of the relation among the acceleration, a time for stop, and an initial velocity.

As illustrated in FIG. 13, it may be recognized that the initial velocity may be calculated as 5.94 km/h through Equation 2 and Equation 3, when the acceleration is 1.6 $m/s^2$, and the time for stop is 1.831 s.

An apparatus for controlling an autonomous vehicle may include a sensor to acquire sensed data on a vehicle surrounding, a driving device to drive the vehicle, and a processor to detect a passenger based on the sensed data, determine a stop point for stopping the vehicle in a stop zone, determine a decelerating section till a specific distance from the stop point, and control a driving device so that a speed of the vehicle at an end point of decelerating section is lower than a speed of the vehicle at the starting point of the decelerating section.

The processor may determine, as the passenger, an object corresponding to a person present within a first reference radius from the stop point.

The processor may determine, as the passenger, an object approaching the vehicle or moving to the stop point, within a second reference radius greater than the first reference radius from the stop point.

The processor may determine the stop point by searching for position coordinates matched with the stop point within a specific distance from the vehicle.

The processor may detect a surrounding object in a region corresponding to the position coordinates, based on the sensed data, and determine whether preceding vehicles stop, to determine the stop point while excluding a region in which the surrounding object is detected.

The processor may control a vehicle velocity to be maintained to a first velocity which is preset, for a specific period within the stop zone, after the stop point.

The processor may control the driving device to have the first velocity at a time point at which the decelerating section is ended, when the passenger is not detected.

The processor may determine a new stop point after starting the stop and may control point, decelerating/accelerating to the new stop point.

The processor may control the driving device to deviate out of the stop zone, when the new stop point fails to determine the new stop point.

The processor may determine the first velocity and whether to accelerate or decelerate the driving device, based on a jerk, an acceleration, and a target stop distance.

A method for controlling an autonomous vehicle may include detecting, by a processor, a passenger, determining, by the processor a stop point for stopping the vehicle in a stop zone, based on that the passenger is detected, determining a decelerating section till a specific distance from the stop point, and controlling a driving velocity so that a speed of the vehicle at an end point of decelerating section is lower than a speed of the vehicle at the starting point of the decelerating section.

The detecting of the passenger may further include determining whether the object is present within a first reference radius from the stop point.

The detecting of the passenger may include determining whether the object approaches the vehicle or moves to the stop point, within a second reference radius greater than the first reference radius from the stop point.

The determining of the stop point may include searching for position coordinates matched with the stop point within a specific distance from the vehicle.

The determining of the stop point may include acquiring, by the sensor, sensed data on a vehicle surrounding, detecting a surrounding object in a region corresponding to the position coordinates, based on the sensed data, and determining the stop point while excluding a region in which the surrounding object is detected.

Decelerating of the driving velocity from an entering time point of the decelerating section may include maintaining a first velocity which is preset for a specific period within the stop zone, after the stop point.

The decelerating of the driving velocity from the entering time point of the decelerating section may include controlling the driving velocity to be decelerated to the first velocity in the decelerating section, when the passenger is not detected.

The decelerating of the driving velocity from the entering time point of the decelerating section may include determining a new stop point after starting the stop point, and may control decelerating/accelerating to the new stop point The decelerating of the driving velocity from the entering time point of the decelerating section may include controlling the driving device to deviate out of a stop zone, when the new stop point fails to be determined.

The controlling of the driving velocity to be decelerated to the first velocity may include determining the first velocity and whether to accelerate/decelerate the driving device.

Figure 14:
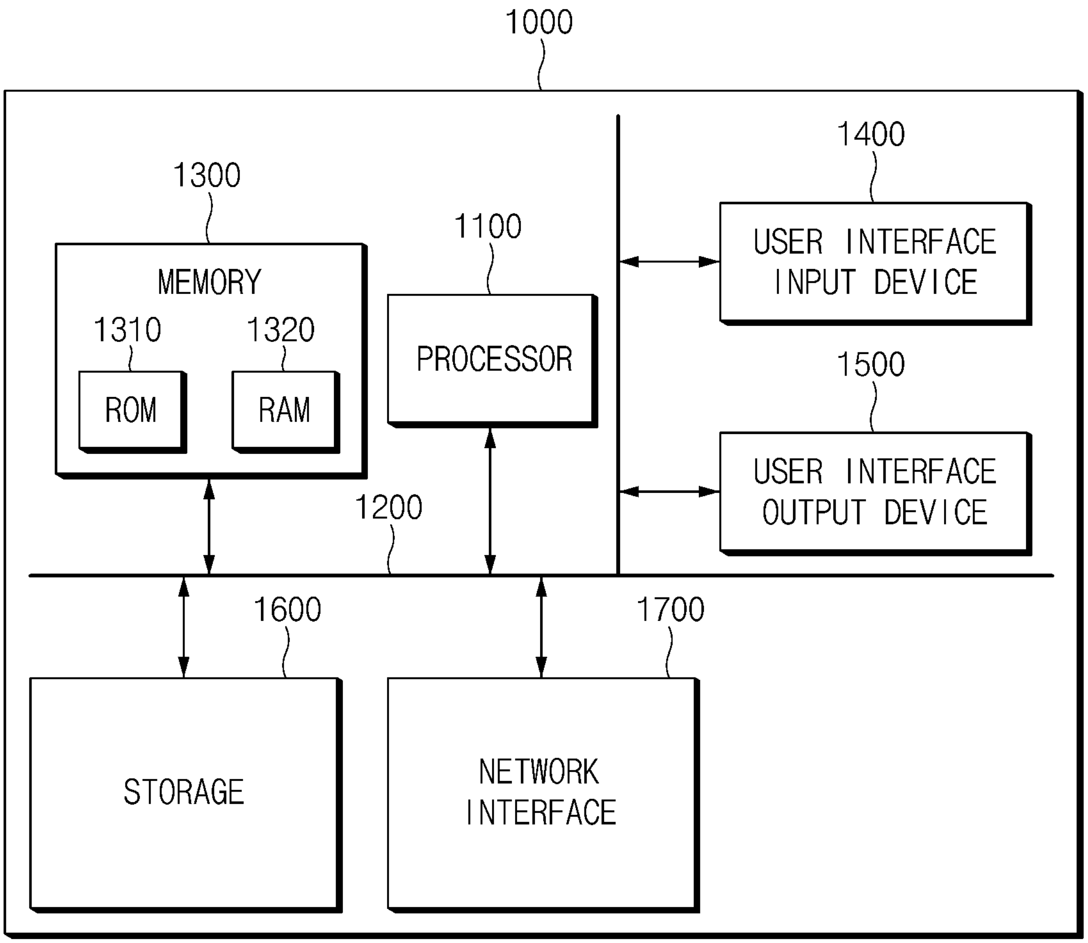
FIG. 14 is a view illustrating a computing system.

FIG. 14 is a block diagram illustrating a computing system.

Referring to FIG. 14, a computing system 1000 may include at least one processor 100, a memory 1300, a user interface input device 1400, a user interface output device 1500, a storage 1600, and a network interface 1700, which are connected with each other via a bus 1200.

The processor 100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the features and/or operations disclosed in the present disclosure may be directly implemented with a hardware module, a software module, or the combinations thereof, executed by the processor 100. The software module may reside on a storage medium (e.g., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 100. The processor 100 may read out information from the storage medium and may write information in the storage medium. Alternatively, the storage medium may be integrated with the processor 100. The processor and storage medium may reside in an application specific integrated circuit (ASIC). The ASIC may reside in a user terminal. Alternatively, the processor and storage medium may reside as separate components of the user terminal.

According to the apparatus and the method for controlling the autonomous vehicle of the present disclosure, when a passenger getting on or getting off a vehicle is absent, the vehicle may be controlled not to stop in the station, thereby preventing the efficiency of the shuttle bus from being lowered.

According to the apparatus and the method for controlling the autonomous vehicle of the present disclosure, since the low velocity is maintained in a specific section, such that the vehicle is able to suddenly stop even after passing through the stop point, unexpected stop may be facilitated.

According to the apparatus and the method for controlling the autonomous vehicle of the present disclosure, the vehicle decelerates at the constant velocity in a specific section before the stop point, thereby reducing that the passenger feels uncomfortable in the stop process.

Besides, a variety of effects directly or indirectly understood through the present disclosure may be provided.

The above description is merely an example of the technical idea of the present disclosure, and various modifications and modifications may be made by one skilled in the art.

Hereinabove, although the present disclosure has been described with reference to various examples and the accompanying drawings, aspects of the present disclosure are not limited thereto, but may be variously modified and altered by those skilled in the art to which the present disclosure pertains without departing from the spirit and scope of the present disclosure claimed in the following claims.

What is claimed is:

1. An apparatus comprising:

at least one sensor configured to acquire sensed data associated with at least one object in proximity to a vehicle;

a driving device configured to drive the vehicle; and at least one processor configured to:

detect, based on the sensed data, a potential passenger;
determine, based on a detection of the potential passenger, a stop point for stopping the vehicle in a stop zone;
determine a decelerating section starting at a position that is spaced a first distance from the stop point; and
control the driving device to control a speed of the vehicle at an end point of the decelerating section to be lower than a speed of the vehicle at a starting point of the decelerating section;
detect, while the vehicle is decelerating within the decelerating section, a cancellation of the stop based on a moving direction of the detected potential passenger; and
control the driving device to cause the speed of the vehicle to be a predetermined first speed at the stop point instead of stopping the vehicle, based on the detected cancellation of the stop.

2. The apparatus of claim 1, wherein a length of the decelerating section is determined based on a current speed of the vehicle, and
wherein the end point of the decelerating section comprises the stop point.

3. The apparatus of claim 1, wherein the at least one processor is configured to:
determine, as the potential passenger, an object corresponding to a person present within a first reference radius from the stop point, or an object approaching the vehicle or moving to the stop point, within a second reference radius from the stop point, wherein the second reference radius is greater than the first reference radius.

4. The apparatus of claim 1, wherein the at least one processor is configured to:
determine the stop point by searching for position coordinates matched with the stop point within a specific distance from the vehicle.

5. The apparatus of claim 4, wherein the at least one processor is configured to:
detect, based on the sensed data, a surrounding object in a region associated with the position coordinates; and
determine the stop point while excluding a region in which the surrounding object is detected.

6. The apparatus of claim 1, wherein the at least one processor is configured to:
after the vehicle stops at a stop point, control the driving device to drive the vehicle at the predetermined first speed through a remaining section within the stop zone; and
detect, while driving the vehicle at the predetermined first speed, whether an additional potential passenger exists.

7. The apparatus of claim 1, wherein the at least one processor is configured to:
control, based on the potential passenger being not detected, the driving device to drive the vehicle at a first speed at a time point at which the decelerating section ends.

8. The apparatus of claim 1, wherein the at least one processor is configured to:
determine a second stop point in the stop zone after passing the stop point, wherein the second stop point is for boarding the potential passenger or another passenger in the stop zone; and
perform accelerating or decelerating before reaching the second stop point.

9. The apparatus of claim 1, wherein the at least one processor is configured to:
control, based on a second stop point being not determined, the driving device to accelerate the vehicle so that the vehicle moves out of the stop zone.

10. The apparatus of claim 6, wherein the at least one processor is configured to:
based on a jerk, an acceleration, and a target stop distance of the vehicle, determine the predetermined first speed and whether to accelerate or decelerate the vehicle.

11. A method comprising:
detecting, by an apparatus, a potential passenger;
determining, by the apparatus and based on a detection of the potential passenger, a stop point for stopping a vehicle in a stop zone;
determining, by the apparatus, a decelerating section starting at a position that is spaced a first distance from the stop point;
controlling, by the apparatus, a speed of the vehicle at an end point of the decelerating section to be lower than a speed of the vehicle at a starting point of the decelerating section;
while the vehicle is decelerating within the decelerating section, detecting, by the apparatus, a cancellation of the stop based on a moving direction of the detected potential passenger; and
controlling, by the apparatus, the speed of the vehicle to be a predetermined first speed at the stop point instead of stopping the vehicle, based on the detected cancellation of the stop.

12. The method of claim 11, wherein a length of the decelerating section is determined based on a current speed of the vehicle, and
wherein the end point of the decelerating section comprises the stop point.

13. The method of claim 11, wherein the detecting of the potential passenger comprises:
determining whether an object is present within a first reference radius from the stop point or whether the object approaches the vehicle or moves to the stop point, within a second reference radius from the stop point, wherein the second reference radius is greater than the first reference radius.

14. The method of claim 11, wherein the determining of the stop point comprises:
searching for position coordinates matched with the stop point within a specific distance from the vehicle.

15. The method of claim 14, wherein the determining of the stop point comprises:
acquiring, by a sensor, sensed data associated with at least one object in proximity to the vehicle;
detecting, based on the sensed data, a surrounding object in a region associated with the position coordinates; and
determining the stop point while excluding a region in which the surrounding object is detected.

16. The method of claim 11, wherein the controlling of the speed of the vehicle comprises:
after the vehicle stops at a stop point, controlling, by the apparatus, a driving device to drive the vehicle at the predetermined first speed through a remaining section within the stop zone; and
while driving the vehicle at the predetermined first speed, detecting, by the apparatus, whether an additional potential passenger exists.

17. The method of claim 16, wherein the controlling of the speed of the vehicle comprises:

controlling, based on the potential passenger being not detected, the speed of the vehicle to be decelerated to the predetermined first speed in the decelerating section.

18. The method of claim 11, wherein the controlling of the speed of the vehicle comprises:

determining a second stop point in the stop zone after passing the stop point, wherein the second stop point is for boarding the potential passenger or another passenger in the stop zone; and performing accelerating or decelerating before reaching the second stop point.

19. The method of claim 11, wherein the controlling of the speed of the vehicle comprises:

controlling, based on a second stop point being not determined, a driving device to accelerate the vehicle so that the vehicle moves out of the stop zone.

20. The method of claim 17, wherein the controlling of the speed of the vehicle comprises:

determining the predetermined first speed and whether to accelerate or decelerate the vehicle, and wherein based on a length of the stop zone being shorter than a threshold length, the position at which the decelerating section starts is determined to be a position outside of the stop zone.

* * * * *